July 25, 1961      E. E. HOOD      2,993,575
SEMI-AUTOMATIC TWO-SPEED HUB AND COASTER BRAKE
Filed Aug. 19, 1960
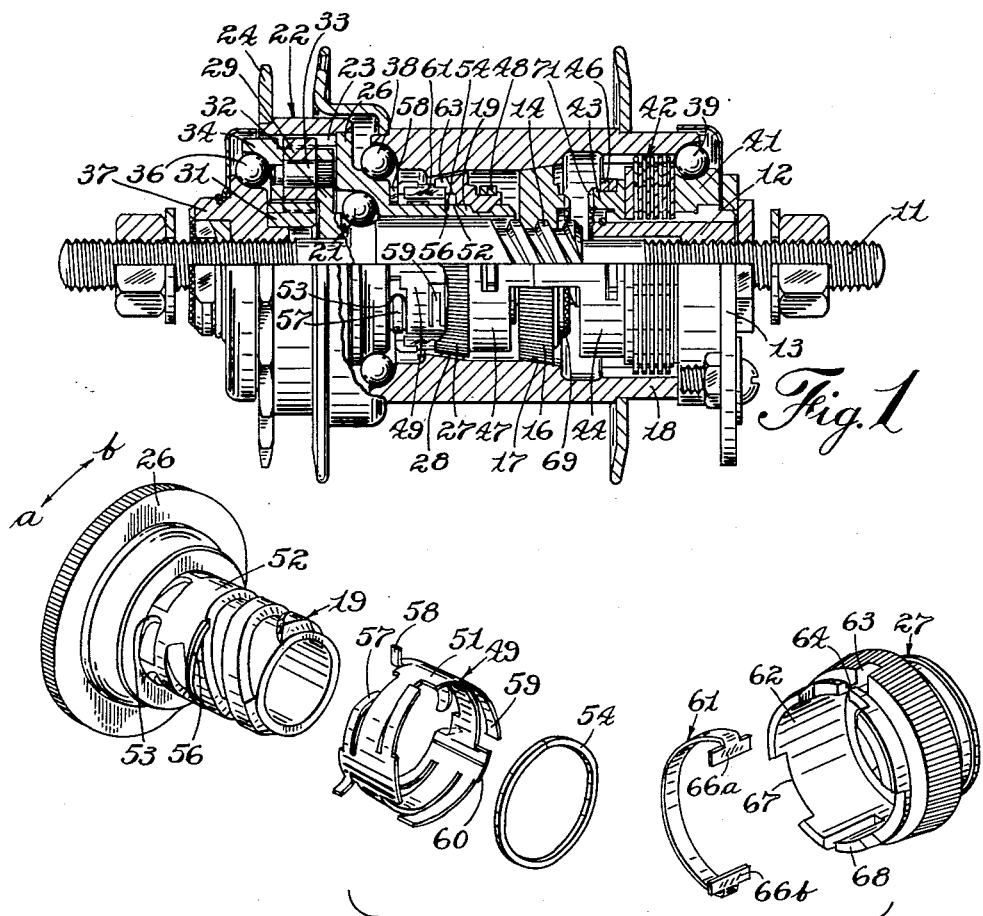
INVENTOR.
Edwin Elliott Hood
WITNESS:

United States Patent Office 2,993,575
Patented July 25, 1961

2,993,575
SEMI-AUTOMATIC TWO-SPEED HUB AND COASTER BRAKE
Edwin Elliott Hood, Elmira, N.Y., assignor to The Bendix Corporation, a corporation of Delaware
Filed Aug. 19, 1960, Ser. No. 50,770
12 Claims. (Cl. 192—6)

The present invention relates to a semi-automatic two-speed hub and coaster brake for velocipedes and the like, and particularly relates to that type in which the shift from one gear or speed to the other is brought about by slight backward rotation of the driving member and more specifically relates to the indexing mechanisms thereof.

In prior art semi-automatic hubs and coaster brakes the high speed driving clutch nuts are alternately blocked from or allowed to drivingly engage the hub by the use of selector and indexing mechanisms which are dependent upon frictional couplings for actuation. Indexing and selector mechanisms dependent on frictional couplings of this general type are illustrated in the co-pending Gleasman application, Serial No. 810,093, filed April 30, 1959, and now Patent No. 2,957,560, and in the co-pending Hood and Gleasman application, Serial No. 816,786, filed May 29, 1959, both applications being assigned to the assignee of this application. While indexing mechanisms actuated by these frictional couplings have worked to a satisfactory degree, there always exists the possibility that the frictional value between the associated and co-operating mechanisms will diminish and thereby cause a malfunctioning of the selector and indexing mechanisms. The provision of indexing and selector mechanisms operated in a positive manner would thus obviate the threat of malfunction due to diminishing frictional forces.

It is, therefore, an object of the present invention to provide a semi-automatic two-speed hub and coaster brake which is simple and durable in construction, compact structurewise, reliable, efficient in operation and inexpensive to manufacture.

It is another object of the present invention to provide a simplified indexing and selector mechanism.

It is still another object of the invention to provide a positive indexing actuation.

It is a further object to provide selector means which will provide positive indexing of the indexing member in a forward direction on the high speed screw shaft responsive to backward rotation of a driving member.

It is a still further object of the invention to provide a positive indexing actuation which can be accomplished with or without the use of a spring mechanism associated with the selector means.

It is an ancillary object of the invention to provide indexing and selector spring means which can be formed from strip materials rather than from drawn stock.

The foregoing and other objects and advantages of the invention will appear more fully from consideration of the detailed description which follows in conjunction with the accompanying drawing wherein two embodiments of the invention are illustrated. It is to be expressly understood, however, that the drawing is for the purpose of illustration and description and is not to be construed as defining the limits of the invention.

The following description is taken in connection and in conjunction with the accompanying drawing in which:

FIGURE 1 is a front elevation, partly broken away and in section, of a preferred embodiment of the invention illustrating the indexing member operatively engaging the high speed clutch nut thereby blocking it from drivingly engaging the hub;

FIGURE 2 is an exploded perspective detail view of the high speed screw shaft, the indexing member and retaining ring, the selector spring and the high speed clutch nut; and FIGURE 3 is a perspective detail view of another embodiment of the indexing spring mechanism.

In FIGURE 1 of the drawing there is illustrated a stationary axle 11 adapted to be mounted in the rear frame of a bicycle or the like. A brake anchor sleeve 12 is threaded on the axle and held from rotation by an arm 13 non-rotatably mounted and retained thereon by a clamping nut. The anchor arm is prevented from rotation by a clip adapted to be attached to the frame of the vehicle in any convenient manner.

The low speed screw shaft 14 is rotatably mounted on the axle and has a low speed clutch nut 16 threaded thereon adapted to be moved into and out of clutching engagement with a clutch surface 17 formed on the interior of the hub 18.

The high speed screw shaft 19 is rotatably mounted on the low speed screw shaft 14 by means of a bearing 21. The driving member, generally indicated at 22, including an orbit gear 23 and a sprocket 24 is fixedly mounted on the high speed screw shaft by a ring member 26 rigidly connected to the driving member and mounted on the adjacent end of the high speed screw shaft by any suitable means such as brazing. A high speed clutch nut 27 is threaded on the high speed screw shaft and adapted to be moved into and out of clutching engagement with a clutch surface 28 formed on the interior of the hub 18.

The driving member through the pinion gearing 29 and a sun gear 31 is also drivingly connected to the end of the low speed screw shaft by means of a pinion carrier 32 for rotating the low speed screw shaft at a different speed or gear ratio than that of the high speed screw shaft. The pinions 29 are rotatably supported on pintles 33 fixedly secured in the pinion carrier 32. A support ring member 34 engages the free extremities of the pintles and provides the outer race for a support bearing 36. A sprocket cone 37 threaded on the axle 11 provides the inner race for the bearing 36 as well as an anchoring means for the sun gear 31.

The hub is rotatably supported by means of bearings 38 and 39 journalled in races formed on the high speed screw shaft 19 and in a brake bearing cone 41, respectively. The bearing cone is fixedly mounted on or is an integral part of the brake anchor sleeve 12.

Brake discs, generally indicated at 42, splined alternately to the hub and the anchor sleeve are arranged to be pressed together against the bearing cone 41 by means of a brake pressure ring 43 also loosely splined to the anchor sleeve 12. The brake pressure ring is retained on the anchor sleeve by any appropriate means such as a lock ring.

Retarder means comprising a coupling member 44 journalled on the brake pressure ring 43 having a splined connection with the low speed clutch nut 16 and a wrap-down helical coil spring frictional retarder 46 journalled on the brake pressure ring provide the necessary retardation of the clutch nuts to cause them to be threaded upon their respective screw shafts. A second retarder means comprising a coupling member 47 journalled on the high speed clutch nut 27 having a splined connection with the low speed clutch nut and a wrap-down coil spring frictional retarder 48 provide retardation of the high speed clutch nut and any associated indexing and selector mechanisms. To this point invention has been adequately and clearly described and claimed in the Hood co-pending application, Serial No. 43,368, filed July 18, 1960.

The indexing and selector mechanism which is associated with the high speed clutch nut comprises the invention of concern in this application. An indexing member, generally indicated at 49, has a substantially cylindrical body 51 which is swiveled on the bearing portion 52 of the high speed screw shaft 19 adjacent the driving ring member 26. Also formed in the end of the screw shaft adjacent the driving ring member 26 is a plurality of ratchet teeth 53. The bight portions of the ratchet teeth are undercut to assure proper engagement hereinafter described. The indexing member is retained on the high speed screw shaft by a split retaining ring 54 seated in a circumferential groove 56 in the high speed screw shaft. The retaining ring does not bottom in the groove 56 when the ends of the ring are together. This is done to provide the swiveled indexing member 49 with as little frictional engagement as is possible.

A plurality of pawl arms 57 are biased for engagement with the ratchet teeth 53. Also formed on the same extremity of the indexing member body 51 are a plurality of radially extending indexing lug members 58. The opposite extremity on the indexing member body 51 is provided with a plurality of outwardly biased spring arms 59 which are of extremely light spring construction and cooperate with selector spring 61 which is hereinafter defined. Shoulder means 60 spacially disposed between the arms 59 abut the retaining ring 54 to limit axial movement of the indexing member.

The high speed clutch nut 27 is provided with an axially extending counterbored portion 62 best illustrated in FIGURE 2. The counterbored portion is adapted to spatially encompass portions of the indexing member 49 during travel of the high speed clutch nut 27 on the high speed screw shaft 19. The high speed clutch nut is further provided with diametrically opposite radial notch means 63 opening into the counterbored portion. The notches 63 are generally referred to as the selector means. The selector spring 61 which is substantially semi-circular or C shaped and of extremely light spring material encompasses the exterior surface of the counterbored axially extending surface and fits in a groove 64 formed therein. The selector spring extremities are provided with tab members 66a and 66b which are disposed in the notch means 63 and extend into the space between the counterbored portion of the high speed clutch nut and the high speed screw shaft bearing portion 51. The extremity of the counterbored portion of the high speed clutch nut is also provided with a plurality of spaced axially opening notch means or voids 67 which define spaced risers 68.

The indexing member 49 and the selector spring 61 do not require heavy gauge material and, in fact, as previously pointed out the spring arms 59 and the body portion of the selector spring 61 are of a light construction. As a consequence the indexing member, and naturally the selector spring, can be made of economical strip stock rather than being formed from drawn stock. This feature accomplishes manufacturing economies not heretofore obtainable and indirectly enables the fabricator to attain a higher degree of quality control and uniformity.

In operation, starting with the parts in the position illustrated in FIGURE 1, forward rotation (which is clockwise when viewing the left-hand end of FIGURE 1, or in the direction indicated as *a* in FIGURE 2) of the driving member 22 is transmitted to the screw shafts. Since the leg means 58 of the indexing member 49 are illustrated as abutting the risers 68 defined by the notches 67 formed on the extremity of the high speed clutch nut counterbored portion, the high speed clutch nut 27 will be effectively prevented or blocked from drivingly engaging the hub clutch surface 28. The low speed screw shaft 14 is concomitantly rotated by the driving member 22 and is threadedly traversed by the retarding means 44 and 46 into driving engagement with the hub clutch surface 17 and drivingly rotates the hub 18 at the lower speed or gear.

When it is desired to operate in high gear, the operator simply back pedals slightly, thus rotating the screw shafts backwardly. The high speed and low speed clutch nuts are prevented from rotating by their retarder connections 44, 46, 47 and 48 to the axle, thus they are caused to be threaded on their respective screw shafts away from the hub clutch surfaces 28 and 17. The backward rotation of the high speed screw shaft 19 in the direction indicated as *b* in FIGURE 2 will cause the extremity of one of the radially outwardly biased indexing members spring arms 59 to engage one or the other of the tabs 66a or 66b of the selector spring 61. The arms 59 will alternately engage the tabs 66 which during backward rotation act like keys projecting into the counterbore. This engagement between the indexing member spring arm 59 and the selector spring 61 will be a positive engagement and will cause the indexing member 49 to be held stationary relative to the backwardly turning high speed shaft due to the retarder means thus causing the pawl member 57 to be indexed in a forward direction to the next or adjacent forward ratchet tooth 53. Upon subsequent forward rotation the indexing member 49 will be so positioned on the high speed screw shaft as to cause the lug members 58 to be positioned in alignment with the notches 67 in the extremity of the counterbored portion of the high speed clutch nut. This will allow the high speed clutch nut to threadedly traverse the high speed screw shaft to the fullest axial extent and permit the high speed clutch nut 27 to engage the hub high speed clutch surface 28.

The notches 67 are of sufficient circumferential extent to accommodate a slight amount of over-indexing between the pawl member 57 and the ratchet teeth 53. The pawl arms will be nudged into the undercut portions of the ratchet to assure a good driving connection. The indexing member 49 upon resumption of forward rotation of the high speed screw shaft will be caused to rotate in the direction *a* with the shaft due to the pawl and ratchet engagement. This forward rotation of the high speed screw shaft and indexing member will be relative to the retarded high speed clutch nut and as a result the spring arms 59 will be repositioned in a forward direction relative to the clutch nut. Since the arms 59 and spring 61 are of a light spring construction, both members will flex easily and will introduce a negligible amount of frictional interference. Since there are two tabs 66 and three arms 59, the tabs will be alternately engaged and upon subsequent forward rotation only one arm 59 will by-pass a tab. As a result of the by-pass engagement the flex of the selector spring 61 will utilize the entire arcuate length of its spring body. Being able to capitalize on the entire spring length of 61 and the light construction of both members 59 and 61, makes the attainment of the desired light spring pressures possible and, additionally, the by-pass action is completed with a minimum of radial movement of each of the members. The spring values of 59 and 61, while being extremely light, are not critical and any deficiency in either member tends to balance out or overcome each other. Thereafter, the indexing member will be positioned on the high speed screw shaft for the next indexing operation.

When the operator desires to operate the brake, he merely back pedals an amount sufficient to cause the low speed clutch nut 16 to be traversed on the low speed screw shaft 14 in the backward direction. This backward rotation results in the dentil surface 69 of the low speed clutch nut engaging the dentil surface 71 of the brake pressure ring 43. Further backward rotation of the low speed screw shaft causes the low speed clutch nut to axially displace the brake pressure ring thereby compressing the brake discs and braking hub rotation. The dentils 69 and 71 effectively prevent relative rotation between the brake pressure ring and the low speed clutch nut when engagement between these members occurs.

In FIGURE 3 there is illustrated a second embodiment of the indexing member. This indexing member 72 has a substantially cylindrical body 73 which is swiveled on the bearing portion 52 of the high speed screw shaft 19. Formed in one extremity of the body 73 are pawls 74 and radial lugs 76 identical to the pawls 57 and lugs 58 of the earlier described embodiment. Formed on the opposite extremity of the indexing member body 73 are outwardly biased spring arms 77 of a light spring construction. The spring arm extremities are angularly disposed as at 78. These extremities 78 are so disposed as to alternately engage the notches 63 in the high speed clutch nut 27 and eliminate the need for a selector spring mechanism. All other parts of this embodiment of the invention are identical and are so numbered.

In operation, the indexing member 72 is swiveled on the high speed screw shaft bearing surface 52 and the pawl members 74 are disposed to engage the ratchet teeth 53. Upon backward rotation of the screw shaft 19 the extremities 78 of the spring arms 77 will be biased into positive engagement with the notch means 63 in the high speed clutch nut 27. This will cause the indexing member 72 to be positively rotarially displaced on the high speed screw shaft in a forward direction causing the pawls 74 to engage the next or adjacent forward ratchet teeth 53. Upon subsequent forward rotation of the high speed screw shaft the indexing member 72 will be driven by the high speed screw shaft and the spring arm extremities 78, which are angularly inclined to the selector means 63 in the counterbored surface of the high speed clutch nut, will be caused to be flexed radially inward so as to become disengaged therefrom thereby allowing the indexing member 72 to be positioned on the high speed screw shaft for the next indexing operation. It will be readily apparent that the slight frictional engagement existing between the spring arm 77 and the selector means 63 will be sufficient to take up any over-indexing which might occur between the pawl members 74 and the ratchet teeth 53. When the indexing member 72 is positioned on the high speed screw shaft, the radial lug members 76 will be caused to be in registry with either the notches 67 or the risers 68 so as to allow or block the traverse of the high speed clutch nut on the high speed screw shaft and either allow or block its driving engagement with the hub 18.

Although certain structures have been shown and described in detail, it will be understood that changes may be made in the design and arrangement of parts without departing from the spirit of the invention.

I claim:

1. A multi-speed hub for bicycles and the like including a plurality of driven screw shafts and complementing clutch nuts for driving the hub at different speeds; means under the control of the operator for alternatively blocking and allowing one of said clutch nuts from drivingly engaging the hub, said means comprising, in combination, ratchet means on one of said screw shafts, an indexing member swiveled on said one screw shaft in the path of travel of said one clutch nut, selector means on said one clutch nut adapted to spatially encompass portions of the indexing member, and circumferentially spaced axially opening notch means in one extremity of said one clutch nut, the indexing member further comprising spaced radial lugs alternately movable into and out of the path of said circumferential notch means, a spring biased arm engageable with said selector means and responsive to backward rotation of said one screw shaft to positively index the indexing member to one of said alternative positions, and a spring biased pawl engageable with the ratchet means and co-operating therewith to maintain the indexed position of the indexing member.

2. The device set forth in claim 1 in which the selector means comprises other diametrically opposed radial notches formed in said one extremity of said one clutch nut, a spring member mounted on said extremity having tab portions engageable in said notch means and cooperating with the indexing member spring arm whereby the indexing member is positively forwardly indexed on the ratchet means responsive to the backward rotation of said one screw shaft.

3. The device set forth in claim 2 in which the selector means spring member further comprises a substantially C shaped body portion yieldably mounted on said one extremity of said one clutch nut, said tab portions being formed on the extremities of the spring body portion and extending radially inwardly into the spatial separation between the selector means and the swiveled indexing member to provide positive operable engagement with the indexing member upon backward rotation of said one shaft and a yieldable engagement upon subsequent forward rotation.

4. The device set forth in claim 1 in which the selector means comprises other diametrically opposed radial notches formed in said one extremity of said one clutch nut, and said indexing member spring arm includes an angularly disposed extremity adapted to positively engage said other notch means responsive to backward rotation of said other screw shaft to thereby index the indexing member on the ratchet means to one of said alternative positions and to yieldably engage said other notch means during portions of forward rotation of said one screw shaft whereby any over-indexing between the indexing member and ratchet means is taken up.

5. In a two-speed hub for bicycles and the like: a stationary axle; a hub rotatably mounted on the axle; a first screw shaft journalled on the axle; a first clutch nut threaded on said first screw shaft for drivingly engaging the hub; a second screw shaft mounted on said first screw shaft; a second clutch nut threaded on said second screw shaft for drivingly engaging the hub; means including gearing for driving the screw shafts at different speeds; means under the control of the operator for alternatively blocking and allowing the driving engagement between said second clutch nut and the hub, said last named means comprising, in combination, ratchet means formed on said second screw shaft, an indexing member swiveled on said second screw shaft in the path of said second clutch nut, selector means on said second clutch nut movable therewith to spatially encompass portions of the indexing member, means on the second clutch nut providing circumferentially spaced voids, said indexing means having a spring pawl bearing on the ratchet means, a spring arm biased for engagement with the selector means, and a radial lug adapted to be alternately brought into and out of registry with the circumferential voids responsive to backward rotation of the shaft driving means to thereby allow or block said second clutch nut from drivingly engaging the hub.

6. The device set forth in claim 5 in which the indexing member spring arm is biased tangentially outwardly into engagement with the selector means to provide positive indexing of the indexing member in a forward direction on said second screw shaft responsive to backward rotation of said second screw shaft.

7. The device set forth in claim 5 in which said second clutch nut is formed with a counterbored annular portion; and in which said selector means comprises diametrically opposite radial opening notch means formed in said annular portion, said circumferentially spaced voids being formed in the free extremity of said annular portion.

8. The device set forth in claim 7 in which the selector means includes a spring member yieldably mounted on said second clutch nut annular portion having tab portions formed thereon engageable in said notch means and extending into the counterbore to provide, during backward rotation of said second screw shaft a positive key-like engagement between the selector means and the indexing member whereby the indexing member pawl is indexed forwardly relative to the ratchet teeth.

9. In a two-speed hub and coaster brake for velocipedes and the like: a fixed axle; an anchor means secured to the axle; a hub rotatably mounted relative to the axle;

brake means interengaging the anchor means and the hub for braking hub rotation; a low speed screw shaft journalled on the axle; a low speed clutch nut threaded on the low speed screw shaft for alternatively drivingly engaging the hub and operatively engaging the brake means; a high speed screw shaft rotatably mounted on the low speed screw shaft; a high speed clutch nut threaded on the high speed screw shaft for drivingly engaging the hub and having a counterbored annular portion extending axially therefrom spatially separated from the high speed screw shaft; a driving member; gear means for rotating the screw shafts from the driving member at different speeds; a first retarder means frictionally coupling the clutch nuts to the axle; a second retarder means frictionally coupling the clutch nuts; means under the control of the operator for alternatively blocking and allowing the driving engagement of the high speed clutch nut, said last named means comprising ratchet teeth on the high speed screw shaft, selector means on the high speed clutch nut counterbored annular portion, an indexing member swiveled on the high speed screw shaft in the path of travel of the high speed clutch nut within portions of the spatial separation between the high speed screw shaft and the high speed clutch nut annular portion; said high speed clutch nut annular portion having circumferentially spaced axially opening notch means formed in the extremity thereof; said indexing member having a spring pawl biased for engagement with the ratchet teeth and having a spring arm biased for engagement with the selector means, said indexing member also including radial lugs having a spaced relationship similar to the high speed clutch nut notch means adapted to be alternately brought into and out of registry with said notch means responsive to backward rotation of the high speed screw shaft.

10. The device set forth in claim 9 in which the selector means comprises: other diametrically opposite radially opening notches formed in the high speed clutch nut annular portion; said indexing member spring arm including an angularly disposed extremity adapted to positively engage said other notches responsive to the backward rotation of the high speed screw shaft whereby the indexing member is indexed forwardly relative to the ratchet teeth and to yieldably engage said other notch means upon subsequent forward rotation of the high speed screw shaft whereby any over-indexing of the indexing member and ratchet teeth is taken up.

11. The device set forth in claim 9 in which the selector means comprises: other diametrically opposite radially opening notches formed in the high speed clutch nut, a spring member mounted on the high speed clutch nut annular portion having tab members engageable in said other notch means and projecting into said spatial separation, said tab members cooperating with the indexing member spring arm responsive to backward rotation of the high speed screw shaft to positively index the indexing member.

12. The device set forth in claim 11 in which the selector spring member comprises an arcuate body portion mounted on the high speed clutch nut annular portion, said tab members being formed adjacent the extremities of said spring body portion and extending radially inwardly into said spatial separation to provide the operable engagement with the indexing member.

References Cited in the file of this patent

UNITED STATES PATENTS 2,944,443    Spencer _____ July 12, 1960